(12) United States Patent
Keshet et al.

(10) Patent No.: US 7,430,334 B2
(45) Date of Patent: *Sep. 30, 2008

(54) DIGITAL IMAGING SYSTEMS, ARTICLES OF MANUFACTURE, AND DIGITAL IMAGE PROCESSING METHODS

(75) Inventors: Renato Keshet, Haifa (IL); Ron Maurer, Haifa (IL); Robert E. Sobol, Fort Collins, CO (US); Christopher Whitman, Fort Collins, CO (US)

(73) Assignee: Hewlett Packard Development Company, L.P., Houston, TX (US)

( * ) Notice: Subject to any disclaimer, the term of this patent is extended or adjusted under 35 U.S.C. 154(b) by 786 days.

This patent is subject to a terminal disclaimer.

(21) Appl. No.: 10/632,291

(22) Filed: Jul. 31, 2003

(65) Prior Publication Data

US 2005/0025379 A1  Feb. 3, 2005

(51) Int. Cl.
*G06K 9/40* (2006.01)
*H04N 3/14* (2006.01)

(52) U.S. Cl. .................. 382/260; 382/263; 382/264; 348/272

(58) Field of Classification Search ................. 382/162, 382/254, 260–275, 279; 348/241, 272, 273
See application file for complete search history.

(56) References Cited

U.S. PATENT DOCUMENTS

| | | | |
|---|---|---|---|
| 3,971,065 A | 7/1976 | Bayer | |
| 5,396,285 A | 3/1995 | Hedberg et al. | |
| 5,446,502 A | 8/1995 | Lebowsky | |
| 5,550,888 A | 8/1996 | Neitzel et al. | |
| 5,561,724 A | 10/1996 | Kido et al. | |
| 5,563,962 A | 10/1996 | Peters et al. | |
| 5,799,111 A | 8/1998 | Guissin | |
| 5,799,112 A | 8/1998 | de Queiroz et al. | |
| 5,825,937 A | 10/1998 | Ohuchi et al. | |
| 5,892,853 A | 4/1999 | Hirani et al. | |
| 5,933,540 A | 8/1999 | Lakshminarayanan et al. | |
| 6,016,366 A | 1/2000 | Konstantinides et al. | |
| 6,177,956 B1 | 1/2001 | Anderson et al. | |
| 6,404,918 B1 * | 6/2002 | Hel-or et al. | 382/167 |
| 6,441,850 B1 | 8/2002 | Dotsubo et al. | |
| 6,636,645 B1 | 10/2003 | Yu et al. | |
| 6,665,448 B1 * | 12/2003 | Maurer | 382/261 |

(Continued)

OTHER PUBLICATIONS

"Digital Image Processing Methods, Digital Image Devices, and Articles of Manufacture"; Renato Keshet et al.; Filed Concurrently.
"Method for Bilateral Filtering of Digital Images"; Ron Maurer.; Filed Concurrently.
"Bilateral Filtering for Gray and Color Images"; www.dai.ed.ac.uk/CVonline/LOCAL_COPIES/MANDUCHI1/Bilateral_Filering.html; Jun. 18, 2002; 8 pps.
"Bilateral Filtering for Gray and Color Images"; Tomsai et al.; Proc. IEEE intl. Conf. on Computer Vision; Bombay, India; 1998; pp. 839-846.

(Continued)

*Primary Examiner*—Kanji Patel

(57) ABSTRACT

Digital imaging systems, articles of manufacture, and digital image processing methods are described. According to one aspect, a digital imaging system includes an imaging system configured to provide image data of an image, the image data comprising digital image data for a plurality of pixel locations and processing circuitry configured to process the image data provided by the imaging system to denoise and sharpen the image data, wherein the processing circuitry, for an individual one of the pixel locations, is configured to identify a respective subset of the image data corresponding to the one pixel location and perform a single processing operation using the image data of the identified subset of the image data to denoise and sharpen the image data of the individual one pixel location.

37 Claims, 5 Drawing Sheets

U.S. PATENT DOCUMENTS

| | | | |
|---|---|---|---|
| 6,731,821 B1 * | 5/2004 | Maurer et al. | 382/263 |
| 6,816,197 B2 | 11/2004 | Keshet et al. | |
| 6,924,841 B2 * | 8/2005 | Jones | 348/294 |
| 6,970,597 B1 * | 11/2005 | Olding et al. | 382/167 |
| 7,015,961 B2 * | 3/2006 | Kakarala | 348/246 |
| 7,068,851 B1 * | 6/2006 | Berkner | 382/261 |
| 7,071,978 B2 * | 7/2006 | Hunter et al. | 348/266 |
| 7,081,919 B2 * | 7/2006 | Jaspers | 348/223.1 |
| 7,088,392 B2 * | 8/2006 | Kakarala et al. | 348/272 |

OTHER PUBLICATIONS

Sanjit K. Mitra, et al.; "A New Class of Nonlinear Filters for Image Enhancement"; Apr. 14, 1991; pp. 2525-2528.

Scott T. Acton; "Edge Enhancement of Infrared Imagery by Way of the Anisotropic Diffusion Pyramid"; Sep. 16, 1996; pp. 865-868.

* cited by examiner

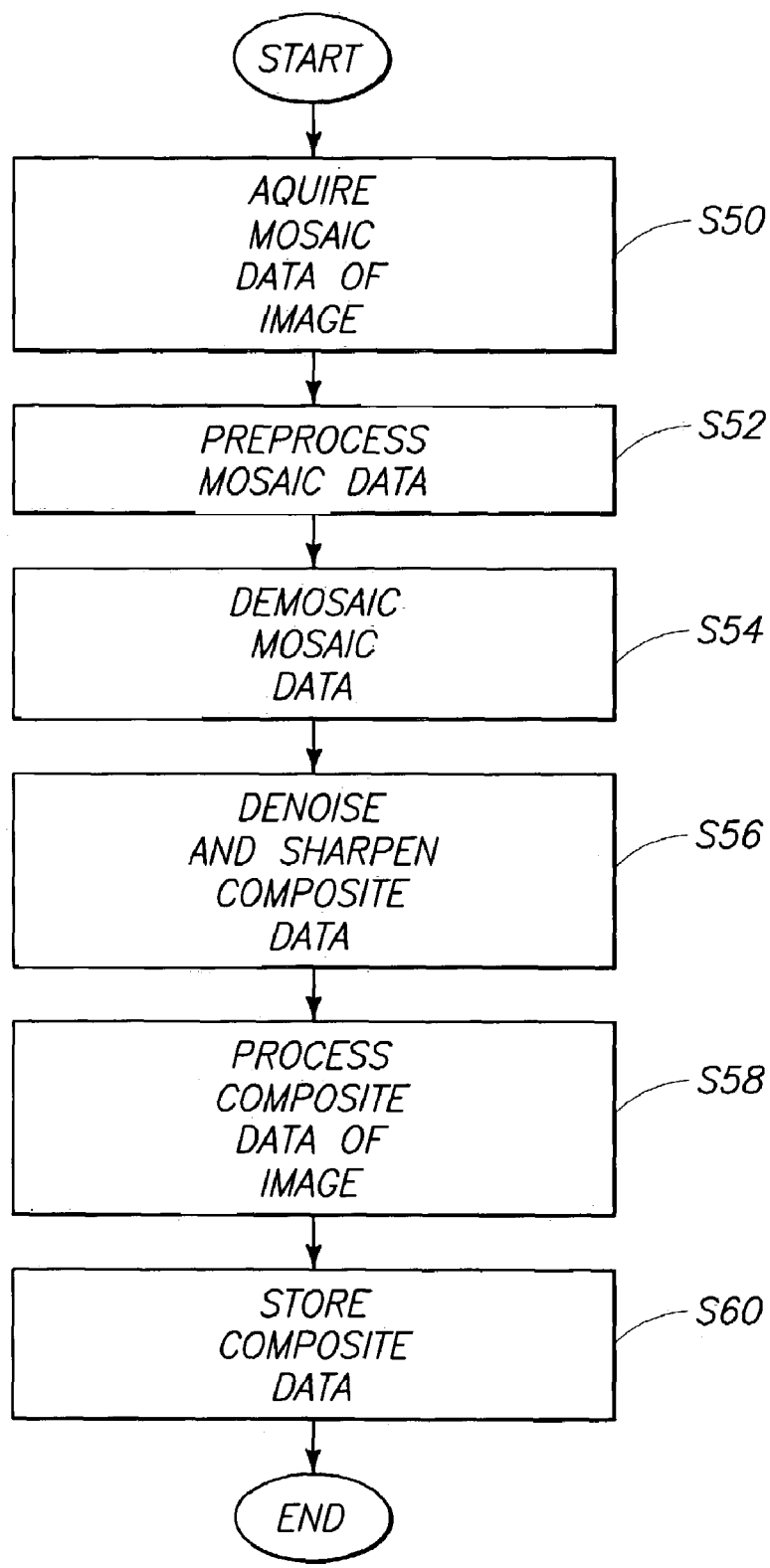

DIGITAL IMAGING SYSTEMS, ARTICLES OF MANUFACTURE, AND DIGITAL IMAGE PROCESSING METHODS

FIELD OF THE INVENTION

Aspects of the invention relate to digital imaging systems, articles of manufacture, and digital image processing methods.

BACKGROUND OF THE INVENTION

Digital imaging systems have experienced vast improvements in recent years. For example, improvements in memory capacity and microprocessor speeds have resulted in significant improvements for digital imaging systems including increased processing speeds and increased available storage. These improvements have led to increased popularity and acceptance of digital cameras by commercial entities as well as individuals.

Digital imaging systems including digital cameras have enjoyed significant improvements in resolution and are capable of producing high-quality photographs. The ability to display images in real time without having to wait for the development of exposures as required in analog systems is a significant improvement over conventional analog devices. Additional advantages of digital cameras enable an individual to download digital files of images from the digital camera to an associated host computer and/or printer. This downloading enables images to be communicated to remote locations using the Internet or other network system. Digital information of images may also be conveniently stored using flash memory, floppy disk, optical disk, or other storage device configurations.

Digital cameras may utilize a color filter array (CFA) of sensors which form data of a subject image and a plurality of mosaics individually including information regarding one color. Subsequently, the mosaic images undergo a demosaicing process wherein information for more than one color is provided at individual pixel locations. Some arrangements utilize interpolation in demosaicing operations to populate additional color information at respective pixel locations.

Denoising and sharpening may be simultaneously performed in conjunction with a demosaicing processing operation. However, denoising and sharpening capabilities may be limited by essentially linear, non-adaptive, and translation invariant demosaicing operations. These limitations are evident by relatively weak denoising strength and oversharpening of artifacts near strong edges. A relatively high amount of sharpening is likely to oversharpen strong transitions within images, in particular, transitions between dark and bright regions. Further, a relatively high amount of denoising is likely to over-smooth an output image causing it to look blurred.

Adaptive filtering may be utilized wherein different filtering kernels are utilized depending upon leading edge directions to solve the aforementioned problems. The output quality of these operations is limited by the number of different possible directions used in a classifier. Additionally, artifacts near high-curvature edges, such as corners and some kinds of texture, may result. It is desired to provide improved methods and apparatus for processing digital image data.

SUMMARY OF THE INVENTION

Aspects of the invention relate to digital imaging systems, articles of manufacture, and digital image processing methods.

According to one aspect, a digital imaging system comprises an imaging system configured to provide image data of an image, the image data comprising digital image data for a plurality of pixel locations and processing circuitry configured to process the image data provided by the imaging system to denoise and sharpen the image data, wherein the processing circuitry, for an individual one of the pixel locations, is configured to identify a respective subset of the image data corresponding to the one pixel location and perform a single processing operation using the image data of the identified subset of the image data to denoise and sharpen the image data of the individual one pixel location.

According to another aspect of the invention, a digital imaging system comprises imaging means for providing image data of an image, the image data comprising digital image data for a plurality of pixel locations and processing means for denoising and sharpening the image data of the pixel locations comprising for an individual one of the pixel locations identifying a respective subset of the image data comprising image data of the one pixel location and image data of at least one other pixel location and processing the image data of the one pixel location and the other pixel location using a robust estimation filter to at least one of sharpen and denoise the image data of the one pixel location.

According to an additional aspect of the invention, an article of manufacture comprises a processor-usable medium comprising processor-usable code configured to cause processing circuitry to access image data for a plurality of pixel locations of an image, wherein the image data comprises color information for a plurality of colors for individual ones of the pixel locations, identify one pixel location, identify a plurality of other pixel locations responsive to the identification of the one pixel location, and apply a robust estimation filter to the image data of the one pixel location and the other pixel locations to at least one of sharpen and denoise the image data of the one pixel location.

According to yet another aspect of the invention, a digital image processing method comprises providing image data of an image, the image data comprising digital image data for a plurality of pixel locations and processing the image data comprising sharpening and denoising the image data using a robust estimation filter.

Other aspects of the invention are disclosed herein as is apparent from the following description and figures.

DESCRIPTION OF THE DRAWINGS

FIG. 6 is a flow chart depicting an exemplary methodology for processing digital image data according to one embodiment.

DETAILED DESCRIPTION OF THE INVENTION

Exemplary digital image devices and methods are provided to obtain and process image data. Image data comprises any data which may be utilized to generate or otherwise produce images. In at least one embodiment, digital image devices and methods are configured to perform demosaicing operations upon image data comprising mosaic data to provide composite data of the image, and the composite data may be subsequently utilized to provide representations of subject images (e.g., photographs). Mosaic data may refer to image data including information of a single color at individual pixel locations and composite data may refer to image data including information of a plurality of colors at individual pixel locations. Exemplary aspects of the invention provide or utilize robust estimation filters to provide denoising and sharpening operations. As described below, denoising and sharpening operations may be performed upon mosaic data prior to demosaicing operations. Other aspects are described and disclosed herein.

Figure 1:
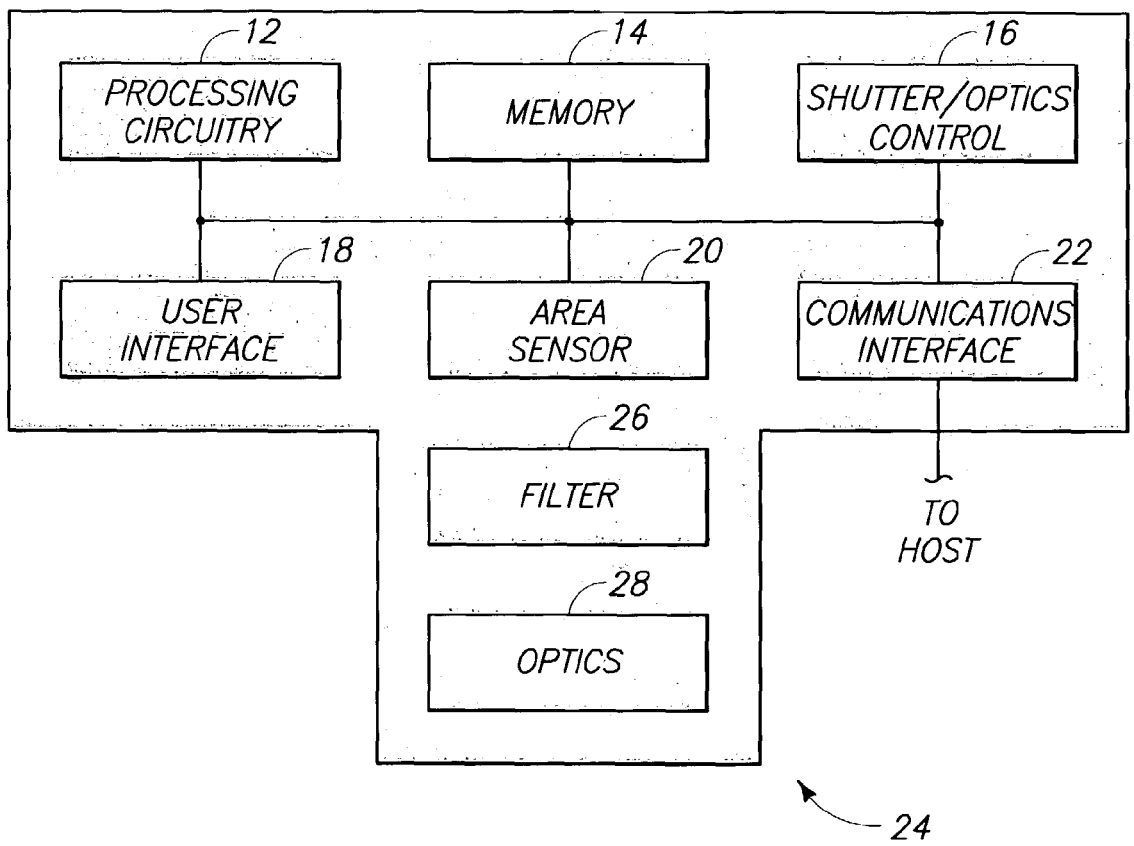
FIG. 1 is a functional block diagram of an exemplary digital image device according to one embodiment.

Referring to FIG. 1, details of an exemplary digital image device 10 are illustrated. The depicted device 10 is configured as a digital camera, such as a digital still camera, digital video camera or other appropriate digital imaging device. Exemplary configurations of a digital camera include a Model 812 or a Model 912, both available from Hewlett-Packard Company. Device 10 may be utilized in stand-alone applications, or with other components of a system (e.g., coupled with a host computer).

As shown in FIG. 1, the exemplary device 10 includes processing circuitry 12, memory 14, shutter/optics control 16, user interface 18, area sensor 20, communications interface 22, and an imaging system 24. The illustrated imaging system 24 includes an area sensor 20, a filter 26 and optics 28 comprising digital imaging components configured to provide mosaic digital image data of an image in the illustrated exemplary embodiment.

The mosaic data comprises digital data corresponding to a plurality of pixels defined by area sensor 20 and filter 26. For example, the mosaic data includes bytes corresponding to the colors of red, green, and blue at respective pixels in an exemplary RGB application. Other embodiments may utilize cyan, magenta, yellow and green (CMYG) information, or other color space information or other formats for representing color information. Further details regarding generation and processing of mosaic data are described below.

Processing circuitry 12 is implemented as a microcontroller in an exemplary configuration. Processing circuitry 12 is configured to execute instructions to control operations of device 10 and the generation and processing of image data. For example, processing circuitry 12 may process digital mosaic data generated by area sensor 20. Additionally, circuitry 12 may control operations of user interface 18 including controlling the display of information using user interface 18 and the processing of inputted data received via user interface 18. Processing circuitry 12 may execute executable instructions stored within articles of manufacture, such as memory 14, mass storage devices (e.g., hard disk drives, floppy disks, optical disks, etc.) or within another appropriate device, and embodied as, for example, software and/or firmware instructions. In other embodiments, some or all of the processing of image data may be performed by processing circuitry externally located from and/or coupled with device 10 (e.g., using a host personal computer).

Memory 14 is arranged to store digital information and instructions. Memory 14 may include a buffer configured to receive mosaic data from area sensor 20 and to store such data for processing. Memory 14 may be embodied as random access memory (RAM), read only memory (ROM), flash memory or other configuration capable of storing digital information including mosaic and/or composite image data, instructions (e.g., software or firmware instructions utilized by processing circuitry 12), or any other digital data desired to be stored.

Shutter/optics control 16 implements focusing operations of optics 28, controls a shutter (not shown) and an aperture (not shown) of optics 28, performs zoom operations, and any other desired control operations of optics 28. In one embodiment, shutter/optics control 16 includes a plurality of motors which are controlled by processing circuitry 12.

Area sensor 20 comprises a plurality of photosensitive elements corresponding to pixels or pixel locations and is configured to provide digital data for generating photographs. For example, area sensor 20 may comprise a raster of photosensitive elements arranged in 1,600 columns by 1,280 rows in one possible configuration. Other raster configurations are possible. Exemplary photosensitive element configurations include photodiodes, charge-coupled devices (CCDs) or CMOS devices in exemplary configurations.

Filter 26 is implemented between area sensor 20 and optics 28. Filter 26 is arranged to implement filtering operations of light received from optics 28 and prior to application of the light to sensor 20. An exemplary filter 26 includes a Bayer Mosaic pattern, for example as described in U.S. Pat. No. 3,971,065, the teachings of which are incorporated herein by reference. An exemplary Bayer Mosaic filter provides light to pixels of area sensor 20 according to the following pattern:

RGRG
GBGB
RGRG
GBGB wherein R, G, and B refer to red, green and blue pixels and color information, respectively. Other filter configurations and area sensor configurations are possible.

Using the exemplary illustrated imaging system 24, digital image data of a plurality of colors of an image are generated. The digital image data initially includes mosaic data comprising a plurality of color sets. Individual sets or planes include pixels of the same colors, spaced by two pixels apart in each direction. In the depicted arrangement, a red color set contains data of the red pixels within the mosaic and the blue color set contains data of the blue pixels within the mosaic. Twice the number of green pixels are provided compared with the red and blue pixels in the exemplary filter 26. Green pixels may be divided into two color sets wherein one set includes data of green pixels having red pixels as horizontal neighbors and another set includes data of green pixels having blue pixels as horizontal neighbors. Accordingly, in at least one configuration, mosaic data including four sets or planes may be provided by area sensor 20. The individual sets may be processed separately from one another and prior to demosaicing operations as described below according to one embodiment.

Following acquisition of mosaic data, processing circuitry 12 may process the mosaic data to provide composite data of an image which may be utilized to generate representations of an image (e.g., photographs). Alternatively, processing of image data may be performed by device 10 in conjunction with or entirely by an external device (e.g., a host personal computer). Mosaic data includes a plurality of sets or planes which individually include digital image data of no more than one color (e.g., red, green or blue) in the described configuration. The mosaic data may be processed (including performing demosaicing operations such as interpolation) to provide composite image data which includes digital image data of more than one color at the individual pixel locations and can be utilized to produce a representation of the image.

Exemplary processing of mosaic data (also referred to as preprocessing) according to one possible configuration includes linearization, flare removal and color balancing operations. Further processing of mosaic data includes denoising and sharpening. According to exemplary aspects, denoising and sharpening may be implemented separately or in a common processing step. A robust estimation filter may be utilized to perform the denoising or sharpening in the described configuration. Examples of robust estimation filters include bilateral filters. Exemplary bilateral filtering operations are described in "Bilateral filtering for gray and color images," by C. Tomasi and R. Manduchi available from *Proc. IEEE intl. Conf on Computer Vision,* 1998, and a U.S. Patent Application entitled "Method of Bilateral Filtering of Digital Images," naming Ron Maurer as inventor, assigned to the assignee hereof and having, and the teachings of the article and the patent application are incorporated herein by reference.

The exemplary filter of the above-incorporated patent application describes a modified bilateral filter which is free of division operations to reduce the number of processing operations necessary to implement filtering. Eqn. 1 provides a formulation for discrete signals wherein the notations are one-dimensional, but may be generalized in a straightforward manner to multidimensional signals such as 2D images. Consider a linear convolution, where f(i) is a single channel input, y(i) a single channel output, and K(j) a convolution kernel wherein indices i and j are two-dimensional vectors. The linear convolution formula may be represented by:

$$y(i)=\Sigma_j f(i-j) \cdot K(j) \qquad \text{Eqn. 1}$$

where the points i−j are neighbors of the point i which belong to the support of the kernel, and the kernel is assumed to be normalized i.e. $\Sigma K(j)=1$. A normalized kernel may be utilized to ensure that a local average (DC level) of the output signal matches the local average of the input signal. In one embodiment, an exemplary filter kernel K(j) is illustrated below:

|   |   |    |   |    |
|---|---|----|---|----|
| 0 | 0 | −1 | 0 | 0  |
| 0 | 0 | 0  | 0 | 0  |
| −1| 0 | 5  | 0 | −1 |
| 0 | 0 | 0  | 0 | 0  |
| 0 | 0 | −1 | 0 | 0  |

The filter kernel K(j) may be implemented in a look up table (LUT) stored within memory 14, within memory of a host device (not shown), or other desired location for storage of data. For the exemplary filter kernel, a value of 5 is associated with the pixel of interest to be modified and values of −1 for four neighborhood pixels to be analyzed are also identified. Image data of the pixel of interest and neighboring pixels of the pixel of interest as defined by the above exemplary or other kernel may be referred to as a subset or group of image data. Other methods may be used to identify a subset or group of image data.

A bilateral convolution formula (eqn. 2) is derived from the linear convolution formula by multiplying each kernel coefficient K(j) by a signal-dependent "photometric weight" g(f(i−j)−f(i)) which depends on a difference between the signal at the point under consideration f(i) and the signal at the neighboring point f(i−j) corresponding to K(j). Since each convolution weight is multiplied by a different factor, the sum of the modified weights is no longer 1, and re-normalization of the weights by a sum of the modified weights may be implemented to avoid increasing the signal average. A resulting bilateral convolution formula may be represented by:

$$y(i)= \frac{1}{\Sigma_i g(f(i)-f(i-j)) \cdot K(j)} \Sigma_j f(i-j) \cdot g(f(i-j)-f(i)) \cdot K(j) \qquad \text{Eqn. 2}$$

The bilateral filter in Eqn. 2 smoothes in directions parallel to edges while sharpening perpendicular to them.

A photometric weight g(•) of Eqn. 2 is typically designed to be close to 1 when the difference $\Delta f=f(i-j)-f(i)$ is small relative to some signal scale σ, and much smaller than 1 when that difference is large relative to σ. A typical metric used in some applications is, for example, a Gaussian metric which may be represented by:

$$g(\Delta f)=\exp\{-½(\Delta f/\sigma)^2\} \qquad \text{Eqn. 3}$$

If the values of the signal f are quantized, then the function g(•) can be pre-calculated for possible values of Δf and stored in a lookup table (LUT) to facilitate processing calculations.

As a step towards eliminating the division operations of bilateral filtering, it was proposed in the above-incorporated patent application to reformulate eqn. 2 by adding and subtracting f(i) so that the sum contains only signal differences (AC) and not the DC part of the signal which may be represented by:

$$y(i)=f(i)+ \frac{1}{\Sigma_i g(f(i)-f(i-j)) \cdot K(j)} \Sigma_j f(i-j)-f(i) \cdot g(f(i-j)-f(i)) \cdot k(j) \qquad \text{Eqn. 4}$$

A zero-order division-free approximation of the above formula as proposed in the above-incorporated patent application consists of removing the denominator in eqn. 4 yielding:

$$y^{(0)}(i)=f(i)+\Sigma_j(f(i-j)-f(i)) \cdot g(f(i-j)-f(i)) \cdot k(j)$$

As shown, the eqn. 5 is a modified bilateral filter having a zero-order approximation although higher approximation orders could also be used.

Aspects of the present invention provide a modified bilateral filter (e.g., eqn. 5) which may be utilized to denoise and/or sharpen digital image data. For example, the described filter may be utilized to denoise and/or sharpen mosaic data in a common processing step before demosaicing operations.

In one arrangement, a metric g(•) of eqn. 5 is implemented to provide denoising and/or sharpening without additional computations. The metric g(•) implements analysis of data of a pixel location of interest (i) with respect to data of neighboring pixel locations (i−j). Aspects of the invention divide a domain of the metric g(•) into three or more regions defined by at least two thresholds T1 and T2 which may be single values or transition periods as described further below. A first region of the domain of metric g(•) may consist of an interval 0-T1, a second region of T1-T2, and a last region of T2-infinity. The first region 0-T1 may be designed to address noise, the second region T1-T2 may be designed to address mainly regular edges of an image, and the last region T2-infinity addresses very high-contrasted edges of images where oversharpening is likely to occur.

In general, the metric g(•) may be designed to have values close to 1 for absolute input values in the first interval, values close to a negative constant −S for absolute input values in a second interval, and values close to 0 for absolute input values in the third interval. The above described exemplary metric tends to smooth noise, sharpen regular edges and not modify highly-contrasted edges. Sharpening can be turned off by setting S=0, oversharpening-artifact removal can be turned off by setting threshold T2 (comprising a single value or a transition period)=infinity, and denoising can be turned off by setting threshold T2 (comprising a single value or a transition period)=0.

Thresholds T1 and T2 and constant S may be tailored according to the specific construction of device 10 being utilized. Further, transition areas may be defined about thresholds to transition from one region to another to minimize discontinuities which may introduce additional artifacts or other defects.

Noise and artifact contrast in dark and bright regions may have different intensities. Accordingly, there may be no single pair of thresholds T1 and T2 which correctly address noise and artifacts equally at all regions of an input image. Eqn. 5 may be modified according to Eqn. 6 to compensate for the different intensities wherein square root operations are applied to pixel intensities prior to a contrast calculation (i.e., square root operations are applied to the subtraction within g(•)) and no square root operations are applied to values outside of g(•):

The metric g(•) values may be implemented within a stored look up table to facilitate calculations by the associated processing circuitry 12, processing circuitry of a host, or other processing circuitry. A contrast calculation may be performed to address the look up table. An exemplary comparison includes comparing intensity data of the respective pixel locations in at least one embodiment. The contrast calculation may be performed wherein the square root of the intensity of the pixel of interest f(i) may be subtracted from the square root of the intensity of respective neighborhood pixel locations f(i−j) to analyze the data of the respective pixel locations and to access the look up table. The look up table may return values depending upon the thresholds T1 and T2. As mentioned above, the look up table generally provides values for denoising for results less than T1, sharpening for results greater than T1 and less than T2 and no modification for results greater than T2.

Thereafter, the obtained metric g(•) values resulting from the contrast analysis and obtained from the look up table are utilized to adjust the data of the pixel location of interest to implement denoising and/or sharpening operations. As indicated by the above exemplary kernel K(j), the intensity data of the pixel of interest is analyzed with respect to intensity data of a plurality of neighbor pixel locations to provide adjustment of the intensity data of the pixel of interest to implement denoising and sharpening.

Figure 2:
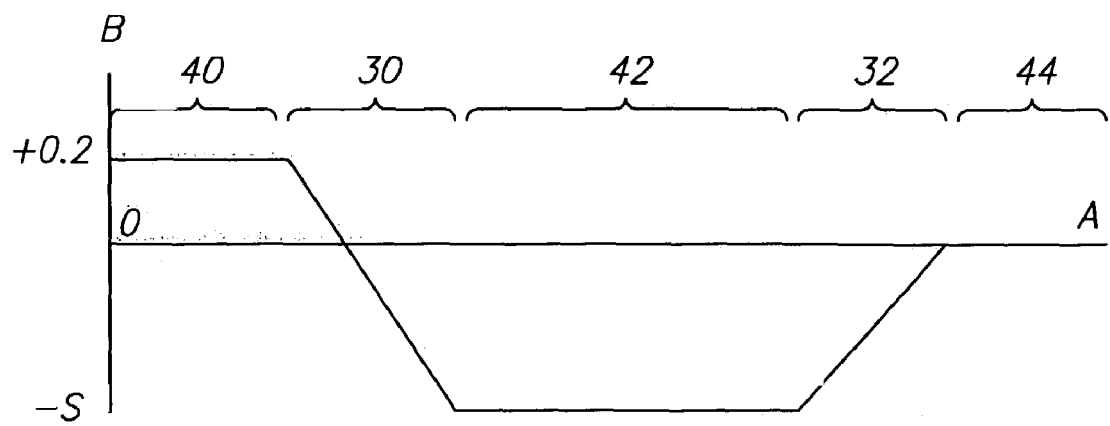
FIG. 2 is an illustrative representation of an exemplary transfer function utilized to derive a plurality of metric values which may be utilized to adjust digital image data according to one embodiment.
Figure 3:
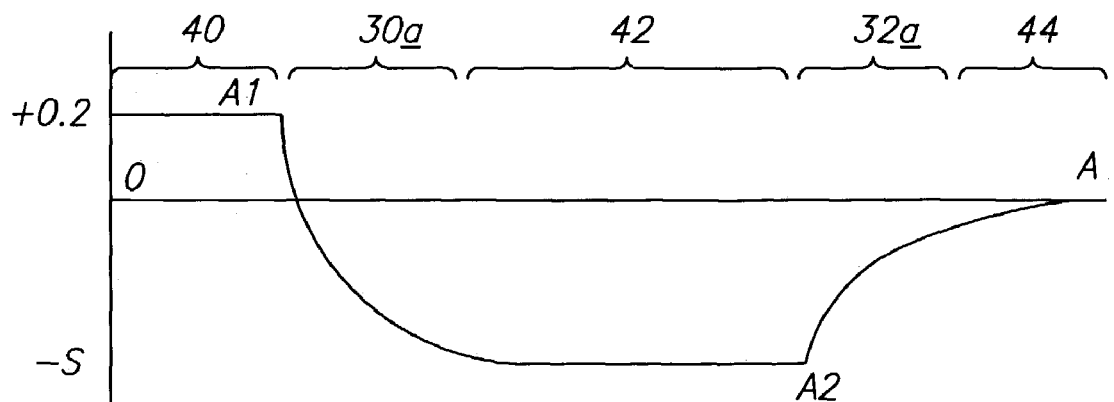
FIG. 3 is an illustrative representation of another exemplary transfer function utilized to derive a plurality of metric values which may be utilized to adjust digital image data according to one embodiment.

Referring to FIGS. 2 and 3, exemplary transfer functions for providing desired look up table values for the metric g(•) are shown.

Referring initially to FIG. 2, a first transition period 30 is illustrated which corresponds to threshold T1 and a second transition period 32 is illustrated which corresponds to second threshold T2 and define three regions 40, 42, 44 described previously. Provision of transition periods as thresholds instead of single threshold values may provide composite data which yields more accurate or more pleasing image representations compared with single threshold values without transition periods inasmuch as values near a threshold may vary significantly (e.g., adjacent values in adjacent regions 40, 42 and 42, 44) providing discontinuous regions within the look up table. Values represented by A in FIGS. 2 and 3 near a threshold fall within a respective transition period 30, 32 in FIG. 2 (or 30a, 32a in FIG. 3) providing more continuous results between adjacent regions 40, 42 and 42, 44 compared with utilization of two fixed single values to define the respective three regions 40, 42, 44.

$$y^{(0)}(i) = f(i) + \underset{K(j)}{\sum_j} (f(i-j) - f(i)) \cdot g(SQRT(f(i-j)) - SQRT(f(i))) \cdot \qquad \text{Eqn. 6}$$

In eqn. 6, g(•) assumes non-integer values between −S and 1 and may be implemented in floating point calculations. Eqns. 7 and 8 may be utilized wherein Ψ has significantly larger absolute values and may be well approximated in an integer implementation.

Referring to FIG. 3, transitions periods 30a, 32a may be defined using a Huber's estimator to transition intermediate adjacent regions 40, 42 and 42, 44, respectively. An exemplary procedure to provide values within transition periods 30a, 32a may be implemented according to:

$$y^{(0)}(i) = f(i) + \sum_j (SQRT(f(i-j) + SQRT(f(i))) \cdot \Psi(SQRT(f(i-j)) - SQRT(f(i))) \cdot K(j)) \qquad \text{Eqn. 7}$$

$$\psi(x)^\Delta = x \cdot g(x) \qquad \text{Eqn. 8}$$

```
// region from 0 to A1
    InterpolateLUT( tablePtr, 0, blurring, A1, blurring); // * 1024
// 1/x rolloff from A1 to A2
    INT32 i;
    for (i = A1; i < A2; i++ )
    tablePtr[i] = -sharpening + (INT32)A1 * (INT32)(blurring + sharpening))/ i;
    INT32 sPrime = tablePtr[A2 - 1];
// 1/x rolloff from A2 to infinity
    for (i = t2; i < 4095; i++ )
    tablePtr[i] = (sPrime * (INT32)A2) / i;
``` where Interpolate LUT is a bilinear interpolator for a lookup table and the operands are:
1. a pointer to the lookup table into which results should be placed; 2. x value of a first endpoint; 3. y value of a first endpoint; 4. x value of a second endpoint; 5. y value of a second endpoint. The function fills in the lookup table between the first and second endpoints according to a linear interpolation between the two.

The transfer functions of FIG. 2 or 3 may be utilized to address a look up table responsive to comparison of intensity data of a pixel-location of interest f(i) with respect to data of a neighbor pixel location f(i–j). The variable A may be calculated according to:

$$A = ABS(SQRT(f(i)) - SQRT(f(i-j)))$$

and A may be utilized to address a look up table to provide a B value which may be utilized to adjust the intensity data of the pixel of interest according to B* (f(i)–f(i–j)) and the corresponding kernel value. As illustrated above with respect to eqns. 6 or 7, the comparison and adjustment operations may be implemented for each of the neighbor pixel locations defined by the filter kernel K(j).

Following denoising and sharpening as described herein, the mosaic data may undergo a demosaicing operation to populate data of a plurality of colors at individual pixel locations. The composite data may be further processed (also referred to as post processing) including one or more of color transformation, tone reproduction, dynamic range compression, jpeg compression, etc.

Figure 4:
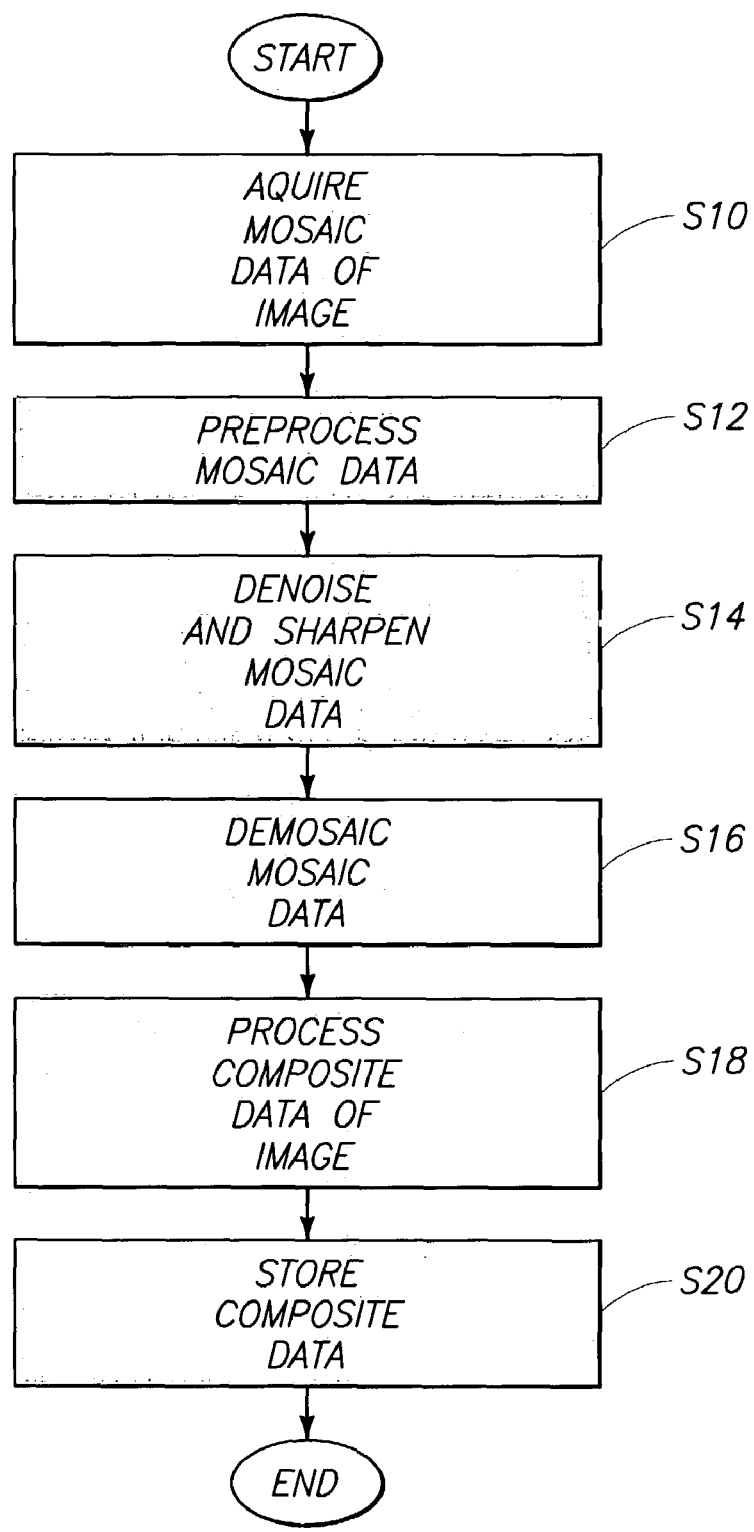
FIG. 4 is a flow chart depicting an exemplary methodology for processing digital image data according to one embodiment.

Referring to FIG. 4, an exemplary methodology for processing digital image data comprising mosaic data is described. The exemplary methodology may be performed by processing circuitry 12 of device 10 and/or utilizing other appropriate processing circuitry (e.g., within a host).

Initially, at a step S10, mosaic data of an image is acquired or accessed.

At a step S12, the mosaic data is pre-processed which may include linearization, flare removal and color balance in exemplary processing operations.

At a step S14, the sets of mosaic data are denoised and sharpened in a single processing operation providing respective sets of processed mosaic data.

At a step S16, the denoised and sharpened data is demosaiced for example using interpolation to provide composite data including data of a plurality of colors at individual pixel locations.

At a step S18, the composite data of step S16 may be post processed including for example, color transformation, tone reproduction, dynamic range compression, jpeg compression etc.

At a step S20, the composite data processed in step S18 is stored.

Figure 5:
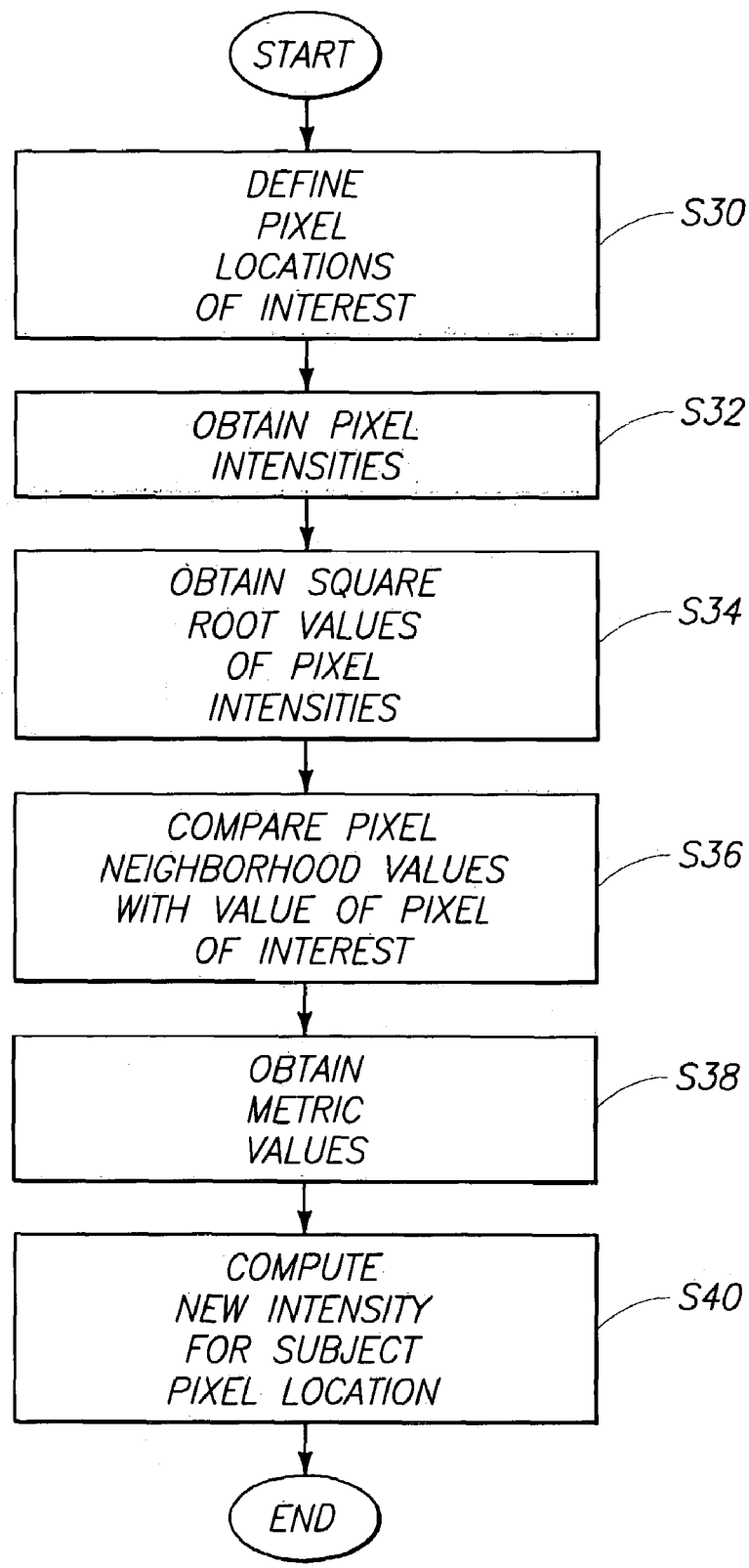
FIG. 5 is a flow chart depicting an exemplary methodology for denoising and sharpening mosaic data according to one embodiment.

Referring to FIG. 5, exemplary denoising and sharpening operations are described and may correspond to step S14 of FIG. 4.

The processing circuitry defines pixel locations of interest at a step S30. For example, a convolution kernel may be utilized to identify a subset of the pixel locations (e.g., including the subject pixel location and appropriate neighbor pixel locations to be used for processing the image data of the subject pixel location) and the respective the image data.

At a step S32, data including pixel intensity data of the identified pixel locations is obtained.

At a step S34, the processing circuitry may obtain square root values of the obtained pixel intensity data.

At a step S36, the square root data of the pixel neighborhood are individually compared with square root data of the pixel of interest in respective comparison operations. In one example, contrast operations are implemented wherein the intensities of the neighborhood pixel locations are subtracted from the intensity of the pixel of interest in respective comparison operations.

At a step S38, metric values are obtained corresponding to the respective comparison operations of step S36. In one embodiment, a look up table is utilized to provide the metric values to implement denoising and sharpening operations according to the thresholds and defined regions as described herein.

At a step S40, a new intensity value may be calculated for the subject pixel location using the identified metric values of step S38, the corresponding intensity values of the neighbor pixel locations, the pixel location of interest and eqns. 6 or 7 described above.

At least some of the aspects of the invention may be implemented using appropriate processing circuitry configured to execute processor-usable or executable code stored within appropriate storage devices or communicated via a network or using other transmission media. For example, processor-usable code may be provided via articles of manufacture, such as an appropriate processor-usable medium comprising, for example, a floppy disk, hard disk, zip disk, optical disk, etc., or alternatively embodied within a transmission medium, such as a carrier wave and/or data packets, and communicated via a network, such as the Internet or a private network or other communication structure.

Utilization of robust estimation filters described herein advantageously provides denoising and sharpening of digital image data comprising mosaic data in one exemplary aspect. Sharpening and denoising capabilities of demosaicing kernels (e.g., used in a demosaicing step of an imaging pipeline) may be significantly reduced or totally disabled in some embodiments wherein denoising and sharpening are performed separately from demosaicing in a previous step. Exemplary denoising and sharpening operations described herein utilize a robust estimation filter prior to demosaicing in at least one aspect (e.g., immediately prior to demosaicing) which receives mosaic data as input and delivers mosaic data as output, for example, to a demosaicing operation. In but one embodiment, mosaic data of individual color sets or planes may be processed separately. In one exemplary process, for each pixel in a current color set or plane, a predefined fixed neighborhood of pixel locations within the same color set is identified or selected (e.g., a four element neighborhood according to the aforementioned kernel) for individual ones of the pixel locations to be processed. A new pixel intensity is calculated using exemplary robust estimation filter equations described herein where the summation is over the elements of the corresponding neighborhood and the output is the final output intensity value for the subject pixel.

Additional exemplary aspects of processing mosaic data are described in commonly-assigned U.S. patent application Ser. No. 10/632,292, which was filed Jul. 31, 2003, entitled "Digital Image Processing Methods, Digital Image Devices And Articles Of Manufacture," listing Renalo Keshet, Ron Mauer, Robert E. Sobol, and Christopher A. Whitman as inventors, the teachings of which are incorporated by reference herein.

Additional embodiments provide apparatus and methods for processing image data comprising information regarding a plurality of colors at individual pixel locations (e.g., composite data). In one embodiment, the processing of the image data implements denoising and sharpening operations, for example using an above-described robust estimation filter.

For example, in one embodiment, information regarding a plurality of colors is provided for a plurality of pixel locations of area sensor 20. In one configuration which utilizes the above-described Bayer-Mosaic filter, processing circuitry 12 or other appropriate circuitry may perform demosaicing operations of obtained data to provide additional color information at individual pixel locations yielding composite data. The provision of additional color information may include fully populating or otherwise increasing the color information at individual pixel locations. In an RGB example, red, green and/or blue values may be provided at individual pixel locations. Other configurations may be utilized to provide fully or additionally populated color information at individual pixel locations.

In one embodiment, composite data having the increased amount of color information may be provided in a color space wherein one or more value of a pixel location corresponds to luminance information and one more value of the pixel location corresponds to chrominance information (e.g., YCC, CIE XYZ, CIE L*a*b*, etc.). For example, image data may be converted from RGB to YCC or other color spaces prior to subsequent processing (e.g., prior to denoising and sharpening).

At least one embodiment provides subsequent processing of composite data having increased color information to sharpen and denoise composite data. The processing may be tailored according to the format of the image data of the composite data. For example, if the image data provides red, blue and/or green information at individual pixel locations (e.g., following demosaicing operations), the robust estimation filters described above may be separately utilized to individually denoise and sharpen the red information, the blue information and/or the green information, respectively, in, different processing steps.

In one embodiment, only a portion of the available composite data at the pixel locations may be processed. For example, if the composite data includes luminance and chrominance information, the luminance information may be processed using the robust estimation filters (or otherwise processed) to denoise and sharpen the luminance information. In exemplary embodiments, the Y information of YCC image data, the Y information of CIE XYZ image data, or the L* information of CIE L*a*b* image % data may be processed to sharpen and denoise the composite data. Processing less than all of the available composite data reduces demands placed upon the processing circuits (i.e., compared with processing the available data) while providing image data which can be used to generate images of improved quality compared with images resulting from image data outputted directly from demosiacing operations or otherwise acquired.

Referring to FIG. 6, an exemplary methodology for processing digital image data comprising composite data is described. The exemplary methodology may be performed by processing circuitry 12 of device 10 and/or utilizing other appropriate processing circuitry (e.g., within a host).

Initially, at a step S50, mosaic data of an image is acquired or accessed.

At a step S52, the mosaic data is pre-processed which may include linearization, flare removal and color balance in exemplary processing operations.

At a step S54, the sets of mosaic data are demosaiced for example using interpolation to provide composite data including information of a plurality of colors at individual pixel locations. Methods other than demosaicing may be used to provide composite data.

At a step S56, the composite data is denoised and sharpened in a single processing operation providing denoised and sharpened composite data. In one embodiment, an entirety of the composite data is processed using a robust estimation filter. For exemplary RGB information, the filter may be applied to one or more of red information, green information and blue information in separate respective processing operations. For exemplary chrominance/luminance information, the filter may be applied to the luminance information. Other processing may be implemented.

At a step S58, the composite data of step S56 may be post processed including, for example, color transformation, tone reproduction, dynamic range compression, jpeg compression, etc.

At a step S60, the composite data processed in step S58 is stored.

The protection sought is not to be limited to the disclosed embodiments, which are given by way of example only, but instead is to be limited only by the scope of the appended claims.

What is claimed is:

1. A digital imaging system comprising:
an imaging system configured to provide image data of an image, the image data comprising digital image data for a plurality of pixel locations; and
processing circuitry configured to process the image data provided by the imaging system to denoise and sharpen the image data, wherein the processing circuitry is configured to:
identify a plurality of subsets of the image data corresponding to respective ones of the pixel locations; and
perform a single processing operation using the image date of the identified subsets of the image data to denoise and sharpen the image data of the pixel locations.

2. The system of claim 1 wherein the processing circuitry is configured to perform the single processing operation using a robust estimation filter.

3. The system of claim 1 wherein the processing circuitry is configured to perform the single processing operation using a robust estimation filter without division operations.

4. The system of claim 1 wherein the processing circuitry is configured to perform the single processing operation using the image data comprising information regarding a plurality of colors at individual ones of the pixel locations.

5. The system of claim 1 wherein the processing circuitry is configured to perform the single processing operation using the image data comprising luminance information.

6. The system of claim 1 wherein the processing circuitry is configured to identify the respective subset of the image data comprising image data of a plurality of other pixel locations.

7. The system of claim 1 wherein the processing circuitry is configured to perform the single processing operation using the image data of the identified subsets of the image data after demosaicing of the image data.

8. The system of claim 1 wherein the processing circuitry is configured to use a single equation to perform the single processing operation to denoise and sharpen the image data.

9. The system of claim 1 wherein the processing circuitry is configured to determine contrast information for individual ones of the individual pixel locations and to perform the single processing operation to one of denoise and sharpen the image data of the individual pixel locations responsive to the determined contrast information.

10. The system of claim 1 wherein the processing circuitry is configured to perform the single processing operation a plurality times for different colors of the image data of an individual one of the pixel locations.

11. A digital imaging system comprising:
imaging means for providing image data of an image, the image data comprising digital image data for a plurality of pixel locations; and
processing means for denoising and sharpening the image data of the pixel locations comprising for an individual one of the pixel locations:
identifying a respective subset of the image data comprising image data of the one pixel location and image data of at least one other pixel location; and
processing the image data of the one pixel location and the other pixel location using a robust estimation filter to at least one of sharpen and denoise the image data of the one pixel location; and
wherein the processing comprises processing using the robust estimation filter comprising a bilateral filter.

12. The system of claim 11 wherein the processing comprises processing using the bilateral filter without division operations.

13. The system of claim 11 wherein the processing comprises processing the image data after demosaicing operations.

14. The system of claim 11 wherein the processing the image data comprises processing the image data comprising luminance information.

15. The system of claim 11 wherein the processing means comprises means for comparing the image data of the one pixel location with the image data of the other pixel location and to select the at least one of the sharpening and denoising responsive to the comparison.

16. An article of manufacture comprising:
a processor-usable medium comprising processor-usable code configured to cause processing circuitry to perform processing comprising:
accessing image data for a plurality of pixel locations of an image, wherein the image data comprises color information for a plurality of colors for individual ones of the pixel locations;
identifying one pixel location;
identifying a plurality of other pixel locations responsive to the identification of the one pixel location;
applying a robust estimation filter to the image data of the one pixel location and the other pixel locations to at least one of sharpen and denoise the image data of the one pixel location; and
demosaicing the image data, and wherein the applying comprises applying after the demosaicing.

17. The article of claim 16 wherein the code is configured to cause the processing circuitry to apply the robust estimation filter comprising a bilateral filter.

18. The article of claim 16 wherein the code is configured to cause the processing circuitry to apply the robust estimation filter comprising a bilateral filter without division operations.

19. The article of claim 16 wherein the image data comprises chrominance information and luminance information and the code is configured to cause the processing circuitry to apply the robust estimation filter to the luminance information of the image data.

20. The article of claim 16 wherein the code is configured to cause the processing circuitry to compare the image data of the one pixel location and the image data of at least one of the other pixel locations, and to select the at least one of the sharpening and the denoising responsive to the comparison.

21. A digital image processing method comprising:
accessing image data of an image, the image data comprising digital image data for a plurality of pixel locations; and
processing the image data comprising sharpening and denoising the image data using a robust estimation filter.

22. The method of claim 21 wherein the robust estimation filter comprises a bilateral filter.

23. The method of claim 21 wherein the robust estimation filter comprises a bilateral filter without division operations.

24. The method of claim 21 wherein the processing comprises processing in a single processing operation.

25. The method of claim 21 further comprising demosaicing the image data, and the processing comprises processing after the demosaicing.

26. The method of claim 21 wherein the providing image data comprises providing image data comprising a plurality of colors for individual ones of the pixels.

27. The method of claim 21 wherein the image data comprises chrominance and luminance information, and wherein the sharpening and denoising comprise sharpening and denoising only the luminance information.

28. The method of claim 21 wherein the processing comprises adjusting image data of one of the pixel locations using image data of at least one other pixel location.

29. The method of claim 28 wherein the adjusting comprises adjusting to denoise the image data responsive to a difference of the image data of the one and the other pixel locations being less than a threshold and adjusting to sharpen the image data responsive to the difference of the image data being greater than the threshold.

30. The method of claim 29 wherein the adjusting to sharpen the image data comprises adjusting responsive to a difference of the image data being less than another threshold.

31. The method of claim 28 further comprising applying square root operations to the image data of the one pixel location and the image data of the other pixel location before the adjusting.

32. The method of claim 21 further comprising:
for an individual one pixel location, comparing image data of the individual one pixel location with image data of an other of the pixel locations;
selecting, for the individual one pixel location, one of the sharpening and denoising responsive to the comparing; and wherein the processing comprises performing the selected one of the sharpening and denoising of the image data of the individual one pixel location responsive to the selecting.

33. The method of claim 21 wherein the processing comprises executing the robust estimation filter a plurality of times for respective ones of a plurality of colors for an individual one of the pixel locations.

34. The method of claim 21 wherein the processing comprises determining contrast information for individual ones of the pixel locations, and selecting one of the sharpening and the denoising the image data for the individual pixel locations using the respective contrast information for the individual pixel locations.

35. A digital imaging system comprising:
   imaging means for providing image data of an image, the image data comprising digital image data for a plurality of pixel locations; and
   processing means for denoising and sharpening the image data of the pixel locations comprising for an individual one of the pixel locations:
      identifying a respective subset of the image data comprising image data of the one pixel location and image data of at least one other pixel location; and
      processing the image data of the one pixel location and the other pixel location using a robust estimation filter to at least one of sharpen and denoise the image data of the one pixel location; and
   wherein the processing comprises processing the image data after demosaicing operations.

36. An article of manufacture comprising:
   a processor-usable medium comprising processor-usable code configured to cause processing circuitry to perform processing comprising:
      accessing image data for a plurality of pixel locations of an image, wherein the image data comprises color information for a plurality of colors for individual ones of the pixel locations;
      identifying one pixel location;
      identifying a plurality of other pixel locations responsive to the identification of the one pixel location; and
      applying a robust estimation filter comprising a bilateral filter to the image data of the one pixel location and the other pixel locations to at least one of sharpen and denoise the image data of the one pixel location.

37. The article of claim 36 wherein the code is configured to cause the processing circuitry to apply the robust estimation filter comprising a bilateral filter without division operations.

* * * * *

UNITED STATES PATENT AND TRADEMARK OFFICE
CERTIFICATE OF CORRECTION

PATENT NO.         : 7,430,334 B2
APPLICATION NO.    : 10/632291
DATED              : September 30, 2008
INVENTOR(S)        : Renato Keshet et al.

Page 1 of 1

It is certified that error appears in the above-identified patent and that said Letters Patent is hereby corrected as shown below:

In column 5, line 42, delete " $y(i)=\Sigma_j f(i-j) \cdot k(j)$ " and insert -- $y(i)=\Sigma_j f(i-j) \cdot k(j)$ --, therefor.

In column 6, line 25, delete " $y(i) = \frac{1}{\Sigma_j g(f(i) - f(i-j)) \cdot K(j)}$ " and insert -- $y(i) = \frac{1}{\Sigma_j g(f(i) - f(i-j)) \cdot K(j)}$ --, therefor.

In column 6, line 50, delete " $y(i) = f(i) + \frac{1}{\Sigma_j g(f(i) - f(i-j)) \cdot K(j)} \Sigma_j f(i-j) - f(i) \cdot g(f(i-j) - f(i)) \cdot k(j)$ " and insert -- $y(i) = f(i) + \frac{1}{\Sigma_j g(f(i) - f(i-j)) \cdot K(j)} \Sigma_j (f(i-j) - f(i)) \cdot g(f(i-j) - f(i)) \cdot K(j)$ --, therefor.

In column 6, line 58, after " $y^{(0)}(i)=f(i)+\Sigma_j(f(i-j)-f(i)) \cdot g(f(i-j)-f(i)) \cdot k(j)$ " insert -- Eqn. 5 --.

In column 7, line 50, delete " $y^{(0)}(i) = f(i) + \frac{1}{K(j)} \Sigma_j (f(i-j) - f(i)) \cdot g(SQRT(f(i-j)) - SQRT(f(i))) \cdot$ "

and insert -- $y^{(0)}(i)= f(i)+\Sigma_j(f(i-j) - f(i)) \cdot g(SQRT(f(i-j))-SQRT(f(i))) \cdot K(j)$ --, therefor.

In column 9, line 6, delete "(INT32)A1" and insert -- ((INT32)A1 --, therefor.

In column 9, line 9, delete "for (i=t2; i< 4095; i++)" and insert -- for (i=t2; i<= 4095; i++) --, therefor.

In column 12, line 4, after "image" delete "%".

In column 12, line 59, in Claim 1, delete "date" and insert -- data --, therefor.

Signed and Sealed this
Twenty-eighth Day of August, 2012

David J. Kappos
*Director of the United States Patent and Trademark Office*